United States Patent [19]

Grigsby

[11] 4,248,190

[45] * Feb. 3, 1981

[54] FLUID INJECTION APPARATUS FOR USE WITH VEHICLES HAVING ON-BOARD COMPRESSED AIR SYSTEMS

[76] Inventor: Gilbert R. Grigsby, 125 W. Avenue 29, Los Angeles, Calif. 90031

[ * ] Notice: The portion of the term of this patent subsequent to Sep. 4, 1996, has been disclaimed.

[21] Appl. No.: 59,732

[22] Filed: Jul. 23, 1979

[51] Int. Cl.[3] .......................... F02M 1/16; F16T 1/14

[52] U.S. Cl. ............................ 123/180 R; 123/179 F; 123/180 AC; 137/204

[58] Field of Search ........ 123/179 F, 180 AC, 180 R, 123/179 A, 179 G, 179 L; 137/204; 222/335, 340

[56] References Cited

U.S. PATENT DOCUMENTS

| | | | |
|---|---|---|---|
| 1,058,209 | 4/1913 | Webb | 123/180 AC |
| 1,659,621 | 2/1928 | Woolson | 123/180 AC |
| 2,729,229 | 1/1956 | Cousino | 137/204 |
| 2,810,393 | 10/1957 | Fites | 137/204 |
| 3,426,508 | 2/1969 | McGrath | 137/204 |
| 3,620,424 | 11/1971 | Grigsby | 123/180 R |
| 4,026,685 | 5/1977 | Grix | 137/204 |
| 4,166,441 | 9/1979 | Grigsby | 123/179 F |

*Primary Examiner*—P. S. Lall

*Attorney, Agent, or Firm*—Fulwider, Patton, Rieber, Lee & Utecht

[57] ABSTRACT

An injector apparatus for injecting starting fluid into the cylinders of an internal combustion engine can be operated by an on-board compressed air system of a vehicle. A reserve air tank provides air to operate a fuel delivery mechanism so that the injector can function in the absence of air pressure in the system.

Preferably, the vehicle has two air systems, a first for the starter and a second, which may be connected to the brakes, that supplies air to operate the injector. A control valve of the injector is responsive to pressure in the first system for synchronization purposes.

12 Claims, 6 Drawing Figures

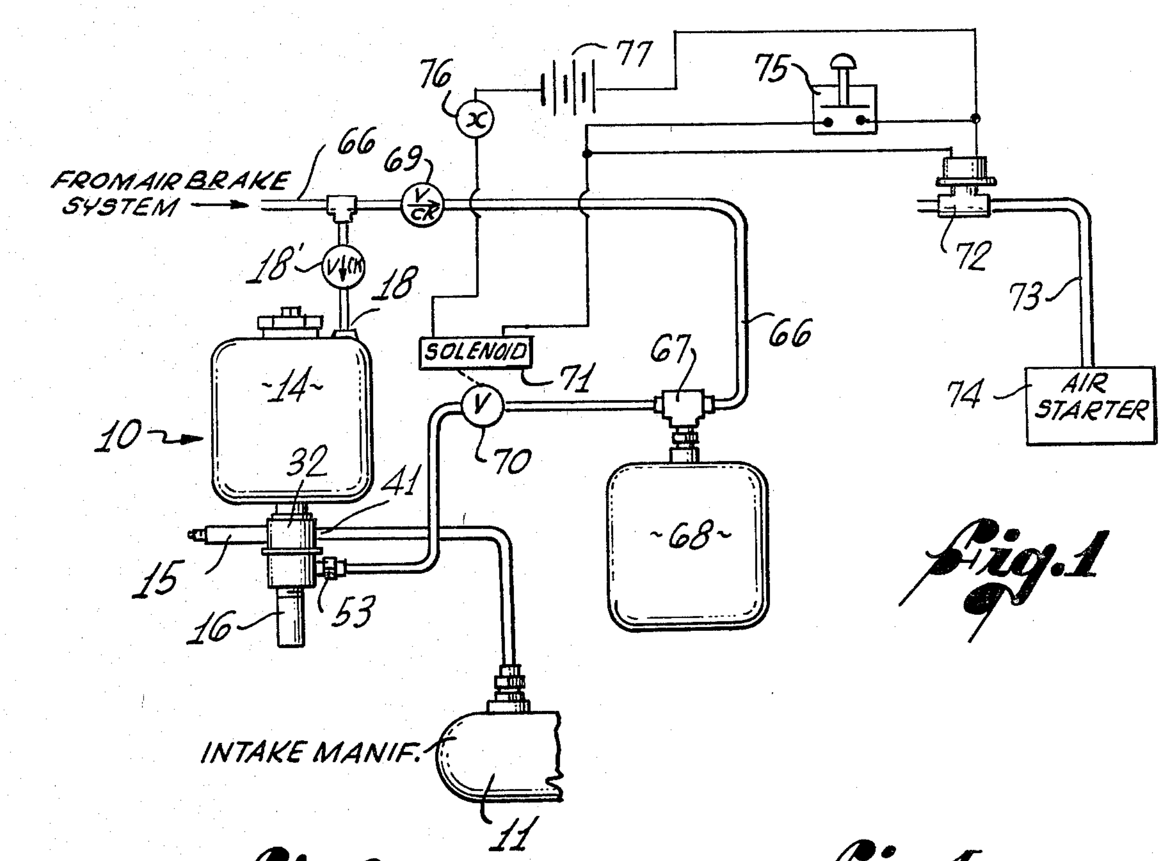
Fig. 1
Fig. 3
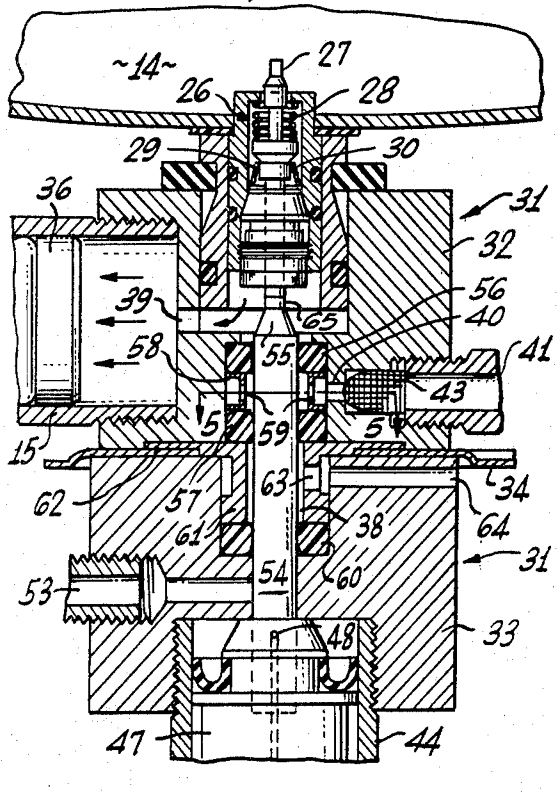
Fig. 4
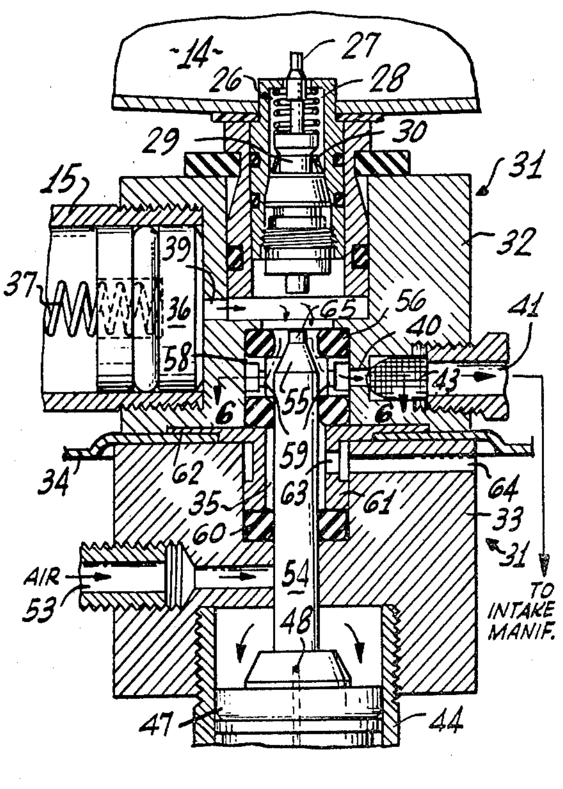

FLUID INJECTION APPARATUS FOR USE WITH VEHICLES HAVING ON-BOARD COMPRESSED AIR SYSTEMS

BACKGROUND OF THE INVENTION

The present invention relates to an injection apparatus particularly suitable for injecting starting fluid into the cylinders of an internal combustion engine, and more particularly to such an apparatus operated by the on-board compressed air system of a motor vehicle.

It is a common practice for internal combustion engines to be left running for long periods because the operator is not confident that the engine can be restarted with the compressed air or battery charge that is available. If an engine having an air starter is unable to start, a compressor must be brought to the engine, often at great expense. On the other hand, leaving the engine running consumes added fuel and contributes to air polution.

An internal combustion engine can be started more easily and with greater confidence if a charge of starting fluid, such as ether, preferably a combination of ether and a lubricant, is injected into the cylinders along with the regular fuel supply. Starting fluid injectors have proven particularly suitable for use with large diesel-powered vehicles since a diesel engine is not started and self-sustaining until it is able to maintain the minimum internal temperature required to cause combustion upon compression of the air-fuel mixture.

Various injector devices have been attached to engines that provide a pressurized supply of starting fluid and include a valve that permits a charge to be injected at the appropriate time. Some such devices allow the valve to be manually operated at will by a remote cable control. A more sophisticated, electrically operated device, described in this inventor's U.S. Pat. No. 3,620,424, issued on Nov. 16, 1971, provides for automatic injection of a predetermined quantity of starting fluid when the engine's starter motor is actuated.

The automatic injector referred to above utilizes a solenoid to operate two valves in sequence whenever the starter motor is energized. A first valve permits starting fluid to escape from a pressurized tank or reservoir into a resilient metering chamber. When the injector is actuated, a second valve permits the predetermined quantity of fluid contained by the metering chamber to be expelled through a starting fluid delivery conduit into the engine. This device insures that a measured quantity of starting fluid is injected each time the engine is started. Since it operation is automatic, it can be arranged to prevent the injection of starting fluid after the engine has been warmed up, thereby avoiding engine damage that could otherwise result.

Vehicles that utilize starting fluid injectors usually have on-board compressed air systems to operate air starters, brakes, horns and other accessory equipment. Copending application Ser. No. 823,398, now U.S. Pat. No. 4,166,441, issued 9/4/79, describes an injector that is powered by compressed air taken from the starter motor system. Many users prefer this arrangement to the use of electrical power for the injector. Some users are, however, hesitant to connect the injector in such a manner that it removes air from the highly sensitive starter motor circuit. Moreover, there are numerous vehicles that are not compatible with that arrangement since they have electric starters rather than air starters.

An alternative to the above approach is to connect the injector so that it is powered by air from a different compressed air circuit of the vehicle, such as the brake circuit. This arrangement is, however, objectionable since the on-board air systems for starter motors and brakes are usually separate. Thus there are circumstances in which starter air is available to start the engine and recharge the brake circuit, but the injector would be inoperative.

Another problem that arises when the injector is connected to the brake circuit of a vehicle equipped with an air starter is that of synchronizing the injector with the starter.

SUMMARY OF THE INVENTION

According to the present invention, a fluid delivery mechanism that supplies starting fluid to the engine of a vehicle is air operated and is provided with a reserve air tank. The air tank is connected to an on-board compressed air system of the vehicle by a first line and the fluid delivery mechanism is connected to the air tank by a second line. Operation of the fluid delivery mechanism is possible regardless of the presence of air pressure in the on-board system since air can be supplied from the air tank. In a preferred embodiment, a check valve is used to prevent upstream flow of air from the tank into the on-board system.

In a particularly advantageous arrangement, the vehicle is equipped with two compressed air systems, the first being connected to the starter while the second is, for example, connected to the air brake. Under some circumstances, there may be pressure in the first system but not in the second. The fluid delivery mechanism remains operative, however, because it is connected to the reserve air tank.

A control valve, which may be solenoid actuated, can be provided in the second line and can be operated in response to the presence of air pressure in the first system. Thus the fluid delivery means is automatically operated in synchronization with the air starter. According to another aspect of the invention, the control valve arrangement described above can be used without the reserve air tank.

The above and other objects and advantages of this invention will become apparent from the following more detailed description when taken in conjunction with the accompanying drawings.

BRIEF DESCRIPTION OF THE DRAWINGS

FIG. 1 is a diagrammatic illustration of an exemplary starting fluid injection apparatus connected to on-board compressed air system of a motor vehicle;

FIGS. 3 and 4 are further enlarged cross-sectional side views of a fragmentary portion of the fluid delivery mechanism showing the metering chamber being refilled and exhausted, respectively.

DESCRIPTION OF THE PREFERRED EMBODIMENT

Figure 2:
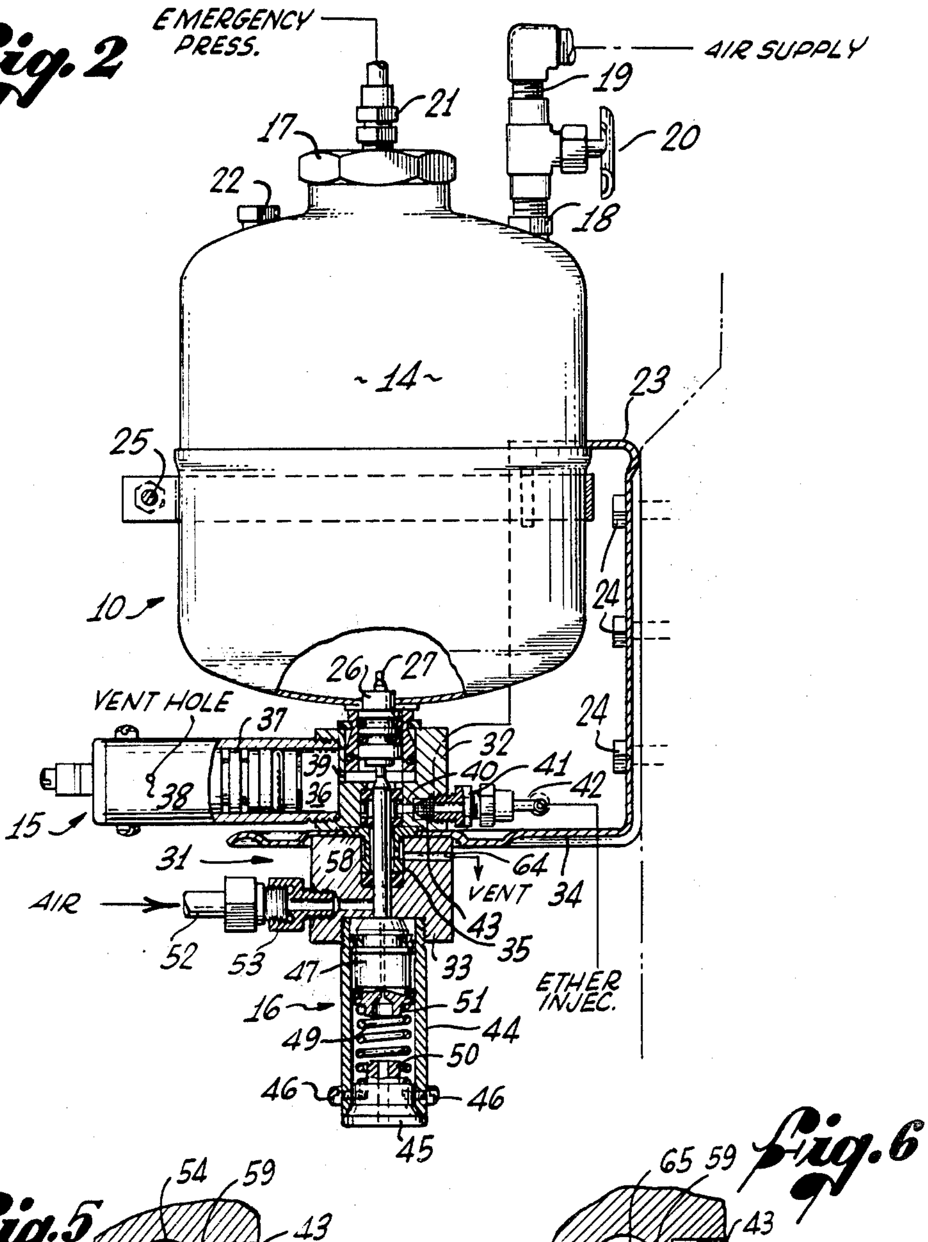
FIG. 2 is an enlarged side view, partially in cross-section, of the fluid delivery mechanism and fluid reservoir of the injection apparatus.

An exemplary injection apparatus 10 embodying many novel features of the present invention is illustrated in FIG. 1 of the accompanying drawings. The apparatus 10 is mounted in the engine compartment of a vehicle that is equipped with an internal combustion engine of the diesel type (of which only the air intake manifold 11 is shown) and an on-board compressed air system 12 that operates an air-driven starter motor 13.

In general, the injection apparatus includes a refillable, pressurized, starting fluid supply tank 14, a metering chamber 15 which measures a predetermined quantity of fluid, and an air-operated actuator 16 that causes the metering chamber contents to be injected into the cylinders of the engine.

The tank 14 is a generally cylindrical tank being of air-tight construction as shown in FIG. 2. Starting fluid is added to the tank 14 in liquid form through an opening at the top sealed by a screw-on cap 17. Air pressure is constantly maintained at the top of the tank 14 by an air supply inlet 18 and a check valve 18'. A shutoff valve 20 is provided in the supply line 19. The tank 14 can, if necessary, be pressurized from any other available alternative source through an auxiliary air supply inlet 21 mounted in the center of the cap 17. A safety valve 22 allows air to escape in the event that the tank pressure exceeds a predetermined maximum, although it will generally be found that, in this non-aerosol system, the tank pressure stays well within safe limits in the environment of the engine compartment. The tank 14 is supported by a bracket 23 attached by bolts 24 to a wall of the engine compartment, the bracket including a flexible metal band 25 clamped around the circumference of the tank.

Figure 5:
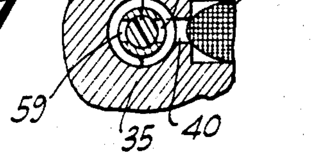
FIGS. 5 and 6 are fragmentary cross-sectional views taken along lines 5—5 and 6—6 of FIGS. 3 and 4, respectively.
Figure 6:
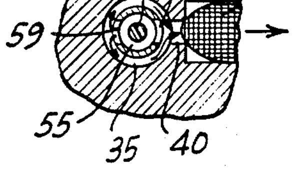

At the bottom of the tank 14 is an outlet in which a valve 26 is positioned to control outward flow of starting fluid. The outlet valve 26, which is of the type commonly used as a tire valve, has an axially movable stem 27 surrounded and engaged by a coil spring 28 that biases the stem downwardly toward a closed position with its head 29 urged against a valve seat 30 (FIGS. 4 and 5).

The outlet valve 26 is supported atop a mounting block 31 made up of aligned upper and lower cylindrical block pieces 32 and 33 with a horizontal plate 34 that forms part of the bracket 23 held between the pieces. Two bolts (not shown) project upwardly from the bottom of the lower block piece 33 through the plate 34, firmly anchoring the block 31 to the bracket 23. A vertical bore 35 extends axially through the center of the block 31 and through an aperture in the plate 34 connecting the outlet valve 26 at the top to the actuator 16 at the bottom.

The metering chamber 15 is horizontally positioned at a level below that of the tank 14 and threadedly received in the side of the upper block piece 32. The chamber 15 forms an elongated cylinder in which a plunger 36 can reciprocate toward and away from the block 31. A coil spring 37 is positioned behind the plunger 36, urging it inwardly toward the block 31 and tending to exhaust the contents of the chamber 15. Venting of air from the back side of the plunger 36 is permitted by a vent hole 38. A first passageway 39 extends horizontally through the block 31 from the chamber 15 to the vertical bore 35, providing a fluid path that connects the chamber to the tank 14 when the outlet valve 26 is open.

On the side of the upper block piece 32 opposite the metering chamber 15, below the level of the first passageway 39, a second passageway 40 connects the bore 35 to a starting fluid delivery outlet 41. A second fluid path is thereby provided leading from the metering chamber 15 through the first passageway 39 to the bore 35, and then through the second passageway 40 to the delivery outlet 41. From the outlet 41, the fluid is supplied by a supply line 42 to the intake manifold 11 (FIG. 2). Any impurities in the starting fluid are blocked by a filter 43 positioned at the outer end of the second passageway 40.

The actuator 16 includes a downwardly projecting air cylinder 44 threadedly attached to the block 31 opposite the tank 14 and in alignment with the bore 35. The bottom end of the cylinder 44 is closed by an end piece 45 which is attached to the walls of the cylinder by two screws 46. A piston 47 is reciprocably disposed within the cylinder 44 for vertical movement toward and away from the tank 14. The sidewalls of the piston 47 are grooved to receive two suitable piston rings. On the opposite side of the piston 47 from the tank 14, a coil spring 49 within the cylinder 44 resiliently biases the piston 47 toward the tank 14, the ends of the spring being positioned by opposing abutments 50 and 51 projecting from the end piece 45 and from the back of the piston.

Compressed air to drive the piston 47 downwardly against the force of the spring 49 is supplied by an air line 52 to an operating air inlet 53 on the side of the lower block piece 33. The air inlet 53 communicates with the cylinder 44 through the lower portion of the bore 35. A very small aperture 48 in the piston 47 permits compressed air to escape from the cylinder 44 through an opening in the end piece 45 to permit the piston to return at a controlled rate, under the force of the spring 49, after it has been driven downwardly by the compressed air.

A rod 54 is attached to the top of the piston 47 and projects upwardly along the center of the bore 35, there being sufficient clearance between the rod and the sides of the bore to permit the flow of compressed air from the air supply inlet 53 into the air cylinder 44. The top end of the rod 54 is tapered forming a closure member 55 which, when the piston 47 is at the top of the cylinder 44 (FIG. 3), is inserted in an upper sealing ring 56 that is pressed against the sides of the bore 35. The closure member 55 and the upper sealing ring 56 thus form a valve which controls the flow of fluid from the metering chamber downwardly through the bore 35 to the delivery outlet 41.

A middle sealing ring 57 disposed below the fluid-delivery outlet 41 is separated from the upper sealing ring 56 by an upper spacer 58 in the shape of a spool disposed within the bore 35. When the closure member 55 moves downwardly to open the valve, fluid exhausted from the metering chamber flows through the open center of the upper sealing ring into the center of the spacer 58 and outwardly to the delivery outlet 41 through radial ports 59 in the sides of the spacer.

The middle sealing ring 57 is spaced from a lower sealing ring 60, at the bottom of the bore 35, by a lower spool-shaped spacer 61 having an enlarged horizontal flange 62 at its top end that extends over the top of the bracket plate 34 and is received by an annular recess in the bottom of the upper block piece 32. A radial opening 63 in the side of the lower spacer 61 permits any starting flow that passes the middle sealing ring 57 and any air that passes the bottom sealing ring 60 to escape through a vent 64 in the side of the lower block piece 33. The length and position of the lower spacer 61 are such that the rod 54, at the bottom of its travel, does not disengage the middle and bottom sealing rings 57 and 60.

At the top of the closure member 55, a pin 65 of lesser diameter projects upwardly to engage the outlet valve stem 27. The length of this pin 65 is such that when the piston 47 is at the top of its stroke, the outlet valve 26 is held open, but when the piston 47 moves downwardly, it disengages the pin permitting the valve to close.

When the injector apparatus 10 is in its normal rest position and no compressed air is being supplied to the air cylinder 44, starting fluid can flow freely along the fluid path extending through the open outlet valve 26, into the bore 35, and through the first passageway 39 into the metering chamber 15. The pressure of the fluid pushes the metering chamber plunger 36 outwardly against the force of the spring 37 so that the chamber 15 contains a charge of a predetermined quantity of starting fluid. The closure member 55 engages the upper sealing ring 56 to prevent fluid from flowing through the bore 35 to the delivery outlet 41.

When compressed air is applied to the air supply inlet 53 and the piston 47 moves downwardly, the descending pin 65 allows the outlet valve 26 to close. As the piston 47 descends further, and after the outlet valve 26 has closed, the closure member 55 disengages the upper sealing ring 56. This disengagement opens the second fluid path from the metering chamber 15, through the first passageway 39, down through the bore 35, and out through the second passageway 40 and the supply outlet to the intake manifold 11. The metering chamber plunger 36, under the resilient force of the spring 37, causes all fluid in the chamber 15 to be exhausted quickly and positively. It should be noted that only the predetermined quantity of fluid present in the metering chamber 15 is injected regardless of the length of time for which air pressure is applied to the actuator 16.

Once the supply of compressed air to the air inlet 53 is discontinued, the air in the cylinder 44 gradually escapes through the aperture 48 in the piston 47, allowing the piston to rise to the top of the cylinder under the force of the piston bias spring 49. As the closure member 55 moves upwardly through the bore 35, it engages the upper sealing ring 56 to block the fluid path from the metering chamber 15 to the air delivery outlet 41. Thereafter, the pin 65 opens the outlet valve 26, allowing the chamber 15 to be refilled from the tank 14.

The structure described above that is mounted below the starting fluid tank 24 forms a mechanism for supplying starting fluid to the intake manifold 11 upon the application of air pressure at the inlet 53. This air pressure is supplied by a line 66 connected to a compressed air system that operates the vehicle brakes (see FIG. 1). A T-connection 67 to the line 66 allows it to communicate with the interior of a reserve air tank 68. Upstream of the T-connection 67 is a check valve 69 that maintains the pressure in the reserve tank 68 in the event of a pressure loss is the air brake system.

Downstream of the T-connection 67, an air line 66', divided by a normally closed control valve 70, leads to the air inlet 53 of the injector 10. The control valve 70 includes a solenoid 71 by which it is opened when an electrical signal is applied to the solenoid.

A pressure sensitive switch 72 is installed in an air line 73 of the air starter circuit that is pressurized only when a starter motor 74 is actuated. Thus when the starter 74 is actuated, the pressure switch 72 is closed, allowing current to flow through the solenoid 71 to open the control valve 70. Automatic synchronization is achieved between the operation of the starter 74 and the operation of the injector 10 despite the fact that the air that operates the injector is taken from the brake system and not the starter system.

It is sometimes desirable to be able to operate the injector 10 independently of the starter 74. For example, after the engine has started but before it has reached normal operating temperature, it may tend to stall and an injection of starting fluid may keep it running. For this reason, a normally open, manually operable switch 75 is connected in parallel to the pressure switch 72 to provide an alternative path for completing the electrical circuit. It is desirable, however, to prevent operation of the injector 10 when the engine is warm. To prevent indiscriminate use of the injector 10, a disabling device 76 in the form of a temperature-responsive switch is connected in series with the control switch 70 and located in the engine compartment. When the engine temperature exceeds a predetermined maximum, the disabling device 76 breaks the ground connection to a battery 77 so that the injector 10 cannot be operated.

In the case of a vehicle equipped with an electric starter but having an on-board compressed air system that serves another purpose, such as the operation of air brakes, the solenoid 70 can be connected directly to the starter system of the vehicle for automatic operation. This eliminates the need for the pressure sensitive switch 72.

It will be noted that, in the case of a vehicle equipped with an air starter, it can happen that there is adequate pressure in the starter system (line 73) to start the engine but no pressure in the brake system (line 66) upstream of the check valve 69. This condition is possible in a vehicle of conventional construction, the two air systems being separate despite the use of a common compressor. It is possible, however, to operate the injector 10 of the invention despite the absence of pressure in the brake air system using the compressed air present in the reserve air tank 68. The injector 10 is, therefore, highly reliable. In addition, it is lightweight and compact, and can be readily connected to a wide variety of existing vehicles without extensive modification.

It will be understood from the following that while particular forms of the invention have been illustrated and described, various modifications can be made without departing from the spirit and scope of the invention. Accordingly, it is not intended that the invention be limited except as by the appended claims.

I claim:

1. In a vehicle having an on-board compressed air system and an internal combustion engine including a plurality of cylinders and an injector apparatus for supplying starting fluid to the cylinders of said engine, said injector apparatus comprising:

a starting fluid reservoir;

fluid delivery means for supplying said fluid to said cylinders in response to the application of air pressure thereto, said delivery means being connected to said reservoir to receive fluid therefrom;

a reserve air tank;

a first air line connecting said reserve air tank to said delivery means; and a second line for connecting said reserve air tank to said on-board compressed air system, whereby said fluid delivery means can be operated by air pressure from said reserve air tank regardless of the presence of pressure in said on-board compressed air system.

2. The apparatus of claim 1 further comprising check valve means for preventing the upstream flow of air from said reserve air tank into said on-board compressed air system.

3. In a vehicle having a multi-cylinder internal combustion engine, an air starter for said engine, a first on-board compressed air system connected to said starter, a second on-board compressed air system separated from said first system so that there can be pressure in said first system when there is no pressure in said second system and an injector apparatus for supplying fluid to said engine, said injector apparatus comprising:

a starting fluid reservoir;

fluid delivery means for supplying starting fluid from said reservoir into the cylinders of said engine in response to the application of air pressure thereto;

an air supply line connected to said fluid delivery means;

control valve means in said first air line for controlling the flow of air to said fluid delivery means; and switch means responsive to the presence to air pressure in said first air system for operating said control valve means.

4. The apparatus of claim 3 further comprising manually actuable means for operating said control valve means.

5. The apparatus of claim 3 further comprising check valve means for preventing the upstream flow of air from said reservoir air tank into said on-board compressed air system.

6. In a vehicle having a multi-cylinder internal combustion engine, an air starter for said engine, a first on-board compressed air system connected to said starter, a second on-board compressed air system separated from said first system so that there can be pressure in said first system when there is no pressure in said second system and an injector apparatus for supplying fluid to said engine, said injector apparatus comprising:

a starting fluid reservoir;

fluid delivery means for supplying starting fluid from said reservoir into the cylinders of said engine in response to the application of air pressure thereto;

a reserve air tank;

a first air line connecting said reserve air tank to said fluid delivery means;

a second air line for connecting said reserve air tank to said second on-board compressed air system;

control valve means in said first air line for controlling the flow of air to said fluid delivery means; and switch means responsive to the presence of air pressure in said first air system for operating said control valve means.

7. The apparatus of claim 6 wherein said switch means produces an electrical signal as its output and said control valve means includes a solenoid responsive to said electrical signal.

8. The apparatus of claim 6 further comprising check valve means for preventing the upstream flow of air from said reserve air tank into said on-board compressed air system.

9. The apparatus of claim 6 further comprising manually actuable means for operating said control valve means.

10. In a vehicle having a multi-cylinder internal combustion engine, an air starter for said engine, a first on-board compressed air system connected to said starter, a second on-board compressed air system separated from said first system so that there can be pressure in said first system when there is no pressure in said second system and an injector apparatus for supplying fluid to said engine, said injector apparatus comprising:

a starting fluid reservoir;

a metering chamber;

a first fluid path connecting said reservoir to said metering chamber;

first valve means for controlling the outward flow of fluid from said reservoir;

a starting fluid delivery outlet;

a second fluid path connecting said metering chamber to said delivery outlet;

second valve means for controlling the flow of fluid from said metering chamber to said fluid delivery outlet;

actuator means for operating said first and second valve means in sequence to exhaust said metering chamber through said fluid-delivery outlet and then to refill said metering chamber from said reservoir, said actuator means comprising an air cylinder, a piston reciprocable within said air cylinder and operatively associated with said first and second valve means, a compressed air inlet permitting operation of said piston by supplying compressed air to said air cylinder, and an air escape outlet allowing air to escape from said system through said piston at a controlled rate;

a reserve air tank;

a first air line connecting said reserve air tank to said air cylinder of said actuator means;

a second air line for connecting said reserve air tank to said second on-board compressed air system;

control valve means in said first air line for controlling the flow of air to said air cylinder of said actuator means; and switch means responsive to the presence of air pressure in said first air system for operating said control valve means.

11. The apparatus of claim 10 wherein said switch means produces an electrical signal as its output and said control valve means includes a solenoid responsive to said electrical signal.

12. The apparatus of claim 11 further comprising manually actuable means for operating said control valve means.

* * * * *